United States Patent [19]

Chevallier

[11] 4,260,275

[45] Apr. 7, 1981

[54] BALL AND SOCKET JOINT AND ITS METHOD OF CONSTRUCTION

[76] Inventor: André Chevallier, Chemin de Pre-Morin, Corenc le Haut-La Tronche, Isere, France

[21] Appl. No.: 940,179

[22] Filed: Sep. 7, 1978

[30] Foreign Application Priority Data

Sep. 8, 1977 [FR] France .............................. 77 27685

[51] Int. Cl.³ ............................................ F16C 11/06
[52] U.S. Cl. .................................................. 403/133
[58] Field of Search ............... 403/133, 122, 142, 135, 403/137, 138

[56] References Cited

U.S. PATENT DOCUMENTS

| 2,433,594 | 12/1947 | Calo | 403/142 X |
|---|---|---|---|
| 2,612,139 | 9/1952 | Collins | 403/142 X |
| 2,921,808 | 1/1960 | David | 403/133 |
| 3,310,326 | 3/1967 | Melone | 403/133 |
| 3,343,857 | 9/1967 | Cislo | 403/133 |
| 3,753,584 | 8/1973 | Kindel et al. | 403/133 |

FOREIGN PATENT DOCUMENTS

| 590038 | 3/1959 | Italy | 403/133 |
|---|---|---|---|
| 990056 | 4/1965 | United Kingdom | 403/133 |

*Primary Examiner*—Werner H. Schroeder
*Attorney, Agent, or Firm*—Basile, Weintraub & Hanlon

[57] ABSTRACT

The invention provides a dismantleable ball and socket joint.

A bearing made of a plastic material is placed in a rigid housing, and is adapted to receive a ball. Accessory component parts, or special shaping of the bearing provide elasticity to the bearing, which enables part of the bearing to change position relative to the housing, according to the direction of insertion or extraction of the ball. On assembly, the bearing contracts and expands.

The assembly of the ball and socket joint requires a much smaller force than that required for extraction of the ball from the socket.

12 Claims, 7 Drawing Figures

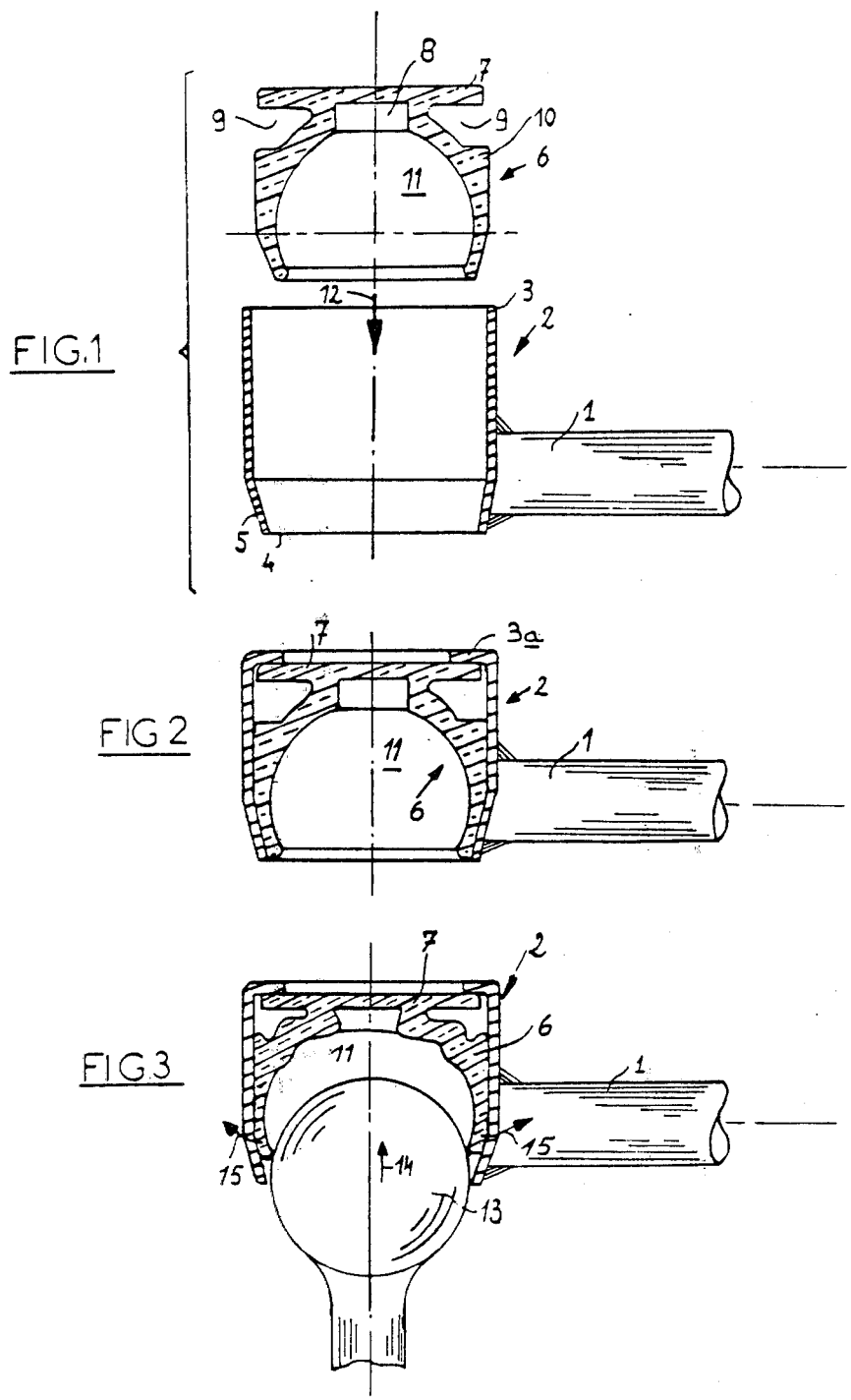

BALL AND SOCKET JOINT AND ITS METHOD OF CONSTRUCTION

BACKGROUND OF THE INVENTION

I. Field of the Invention

The present invention relates to ball and socket joints of the kind used, for example, on control levers, wherein the ball is engaged in a bearing made from resilient material such as a plastic, the bearing being lodged in a rigid housing, and the ball being capable of dismantling from the bearing. The socket of the ball and socket joint is, therefore, defined by the bearing and the rigid housing in which it is lodged.

II. Description of the Prior Art

In a well known construction, the force required to introduce a ball into the interior of a bearing, is equivalent to that which is necessary for its retention in the bearing. The assembly of this type of ball and socket joint presents certain difficulties. Frequently, the assembly has to be carried out manually, and often in an inconvenient position. Furthermore, when it is required to dismantle the ball and socket joint, it is usually necessary to set up a bearing surface for levering the ball out of the socket in order to facilitate the extraction. In addition, during the course of manufacture, the insertion of the ball requires a significant effort on the part of the fitter.

With a view to overcoming these difficulties, there are constructions, which include a removable key, which holds the ball captive in the bearing. This construction is more complex and, furthermore, the key is sometimes lost. Another known arrangement uses a bearing made in two parts, which are movable in relation to each other, to secure the ball.

SUMMARY OF THE INVENTION

The object of the present invention is to provide a ball and socket joint which requires considerably less effort for inserting the ball into the bearing, than the known ball and socket joints wherein the ball has to be forced into the bearing, and although the force required for the extraction of the ball remains considerable, nevertheless, it permits dismantling of the articulation joint.

According to the present invention a socket of a ball and socket joint comprises a rigid housing in which is located a bearing made of resilient material. The bearing has a part spherical internal seating surface and an opening at one end to receive a ball. The construction of the bearing itself or a device acting on the bearing is such that the bearing has an elasticity in the axial direction of insertion of the ball, whereby the bearing is capable of movement in the axial direction relative to the rigid housing. Preferably, the part of the bearing around the opening is located in a part of the housing of reduced cross-section. However, when displaced in the direction of insertion, as permitted by the elasticity, this part of the bearing enters a part of the housing of larger cross-section, whereby the part of the bearing around the opening distends to enlarge the opening when in the displaced position.

According to another preferred feature, the bearing has a main portion, in which the seating surface is formed, and a base. Additionally, there is one or more cavities between the main portion and the base, whereby the main portion is adapted for axial movement relative to the base when the bearing is placed in compression. This arrangement provides the elasticity of the bearing. The base of the bearing, preferably, rests on an internal shoulder of the housing. The open end of the bearing is, preferably, arranged in an open end of the housing.

In an alternative construction, a spring component is located between the closed end of the bearing and an internal shoulder of the housing to provide the axial elasticity of the bearing.

According to another preferred feature, the seating surface in the bearing extends over more than half a sphere, so that the opening has a diameter less than that of the spherical seating surface.

Preferably, the housing is cylindrical, and the reduced cross-section part of the housing is formed by a truncated cone and the part of the bearing around the opening has a complimentary truncated conical shape. Alternatively, the housing may be cylindrical, and the reduced cross-section part be formed by an inturned flange at one end of the housing.

According to a preferred feature of the invention, a ball and socket joint has a socket as previously described, and a ball received in the bearing, the ball having a diameter greater than the diameter of the opening in the bearing, but less than the smallest diametral dimension of the reduced cross-section part of the housing.

The present invention, also, contemplates a method of assembling a ball and socket joint which comprises the steps of:

(a) providing an open-ended rigid cylindrical housing on a first articulation component, the housing having a reduced diameter at its front end;

(b) providing a bearing formed by molding it in a single piece of resilient material, the bearing having a base at its rear end, a part spherical internal bearing surface and an open front end, the opening being of smaller diameter than the part spherical bearing surface;

(c) inserting the bearing through the open rear end of the housing and engaging the front end of the bearing with the reduced diameter portion of the housing;

(d) bending over the rear end of the housing to provide an inwardly directed support shoulder for engagement by the base of the bearing;

(e) inserting a ball on a second articulation component through the open front end of the bearing, and wherein the engagement of the ball with the front end of the bearing causes the latter to be displaced axially towards the rear as permitted by the construction and/or arrangement of the bearing, so that the ball can enter its part spherical seating in the bearing.

Preferably, the axial force applied through the ball during its insertion is transmitted to the bearing. The front portion of the bearing, then, retracts into the housing to disengage itself from the reduced diameter portion of the housing, so that a mechanical "play" is created between the front portion of the bearing and the housing. This "play" permits the front portion of the bearing to distend outwardly, thus, allowing the ball to enter through the open front end and to seat in the part spherical seating, the front end of the bearing, then, contracting over the front of the ball to retain the latter in the bearing.

According to a still further preferred feature of the invention, in a method of extracting the ball from a ball and socket joint of the type previously described, or from a ball and socket joint assembled as previously described, the force of extraction of the ball is required to compress the front part of the bearing between the ball and the reduced cross-section portion of the housing until the ball can pass through the open end of the bearing, whereby the force required for extracting the ball is considerably greater than that required for its insertion.

The force required for insertion of the ball, can be predetermined in proportion to the effort of extraction, e.g. 10%, 25%, or 50%.

Several constructions each in accordance with the invention, will now be described by way of examples only, with reference to the accompanying drawings, in which:

BRIEF DESCRIPTION OF THE DRAWING

FIG. 1 is an axial section through a housing and a bearing prior to insertion of the bearing in the housing;

FIG. 2 is an axial cross-section through the assembled bearing and housing;

FIG. 3 shows the position of the bearing, in the housing, during the insertion of a ball;

DESCRIPTION OF THE PREFERRED EMBODIMENT

Figure 4:
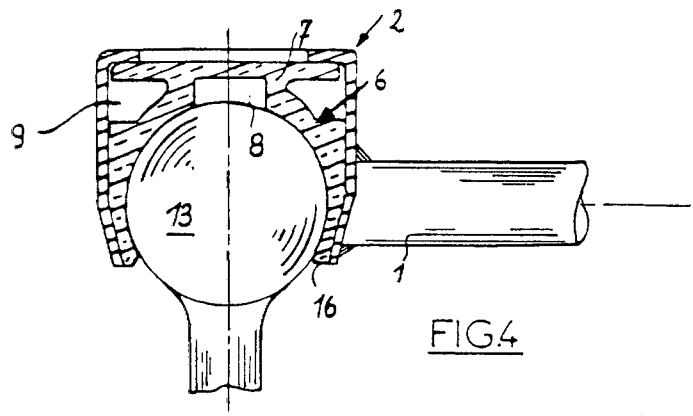
FIG. 4 is an axial cross-section through the completed ball and socket joint.

Referring, now, to the drawing and in particular FIG. 1, there is illustrated a rod or bar 1 at one end of which there is secured a housing 2, in the form of a cylindrical crown or tube. The housing is open at the rear end 3, and at its front end, it has a smaller diameter open end 4, at the end of a truncated conical portion 5, which forms a reduced diameter portion of the housing. A bearing 6 is manufactured from a resilient plastic material, and is intended to be embedded in the bore of the housing 2. This bearing 6 displays several features:
- a base 7 at its rear end, which is generally in the form of a disc;
- a body portion 10 which constitutes the bearing proper;
- at least one hollow or cavity (two of which are shown) 8 and 9 provided between the base 7 and the body 10;
- a part spherical seating 11 formed in the body, and open at the front end at a position beyond the equatorial plane of the spherical seating;
- a front end portion surrounding the open end of the bearing, which has a truncated part conical shape, complimentary to that of the part 5 of the housing and capable of engagement with the part 5.

The bearing 6 is fitted into the housing 2, by inserting it through the open rear end 3 of the housing in the axial direction indicated by the arrow 12 in FIG. 1. The dimensions of the housing 2 and the bearing 6, are such, as to provide a precise positioning of the bearing in the housing. When the truncated conical front end of the bearing seats in the conical end 5 of the housing, the rear end of the housing extends beyond the base 7 at the rear of the bearing.

In one method of construction, the end part of the housing which then extends beyond the bearing is bent over, inwardly, so that it provides a supporting internal shoulder or rim 3a (FIG. 2) engaging against the rear of the base 7 of the bearing. The housing, equipped with its bearing, then provides a socket ready to receive the ball.

Figure 6:
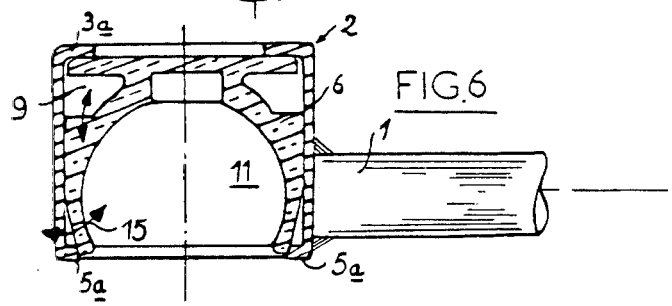
FIG. 6 is an axial section similar to FIG. 2, but showing an alternative construction of the housing.

It will be appreciated, that the construction described above with reference to FIGS. 1 and 2, can be the subject of various modifications, without deviating from the invention. For example, it is possible to:
- manufacture the housing, as illustrated in FIG. 6, by bending over at right angles, the front end portion 5a of the cylindrical housing, in order to produce a reduced diameter front end, with an opening 4;
- utilize a housing having a flat base and initially of the same internal diameter throughout its length, fitting the bearing 6 through the front end, and then shaping the conical end 5, for example by spinning or swaging, after insertion of the bearing 6;
- utilize a housing made in the form of a casting, whereby the conical end 5 can be molded or formed, after the insertion of the bearing 6, or by the addition to the housing of a part which has been bent over to provide an inturned shoulder as shown in FIG. 6, or a conical end as shown in FIG. 1.

Referring, now, to FIG. 3 ball 13, which is to be inserted into the seating 11 of the bearing, has a diameter which corresponds to that of the seating 11. The diameter of the ball 13 is, also, larger than the diameter of the opening at the front end of the bearing 6, but smaller than the diameter of the opening 4 of the housing. Thus, when the ball 13 is pressed in the axial direction indicated by the arrow 14 in FIG. 3, it exerts an axial force on the front end of the bearing 6. The body 10 is able to seat on the ball, by virtue of the elasticity created by the shaping of the bearing, particularly the cavities 8 and 9. As illustrated in FIG. 3, this elasticity permits axial compression of the body 10 towards the base 7, so as to disengage the front end of the bearing from the smallest diameter portion of the truncated part 5 of the housing. This change of position of the bearing provides a mechanical "play" between the front end of the bearing and the housing 2. This enables the ball 13 to distend the front end of the bearing outwardly, against the large diameter portion of the housing, as indicated by the arrows 15 in FIG. 3. The diameter of the open end of the bearing increases sufficiently to allow the maximum diameter of the ball to pass through so that the ball is able to seat in the bearing 6.

In summary, the axial force on the ball 13 causes, on insertion, an axial contraction of the bearing 6, which gives rise to an easily accomplished radial change of the position of the parts of the bearing, and this lessens the effort needed for the insertion of the ball into the bearing.

As soon as the maximum diameter of the ball has passed through the entrance to the seating 11, the front end portions of the seating return to their initial position due to the resilience of the seating, and thereby retain the ball in the bearing. The ball and socket joint thus coupled, is illustrated in FIG. 4, where the ball 13 is in intimate contact with the seating surface 11 of the bearing, over more than half of the spherical surface of the ball.

Figure 5:
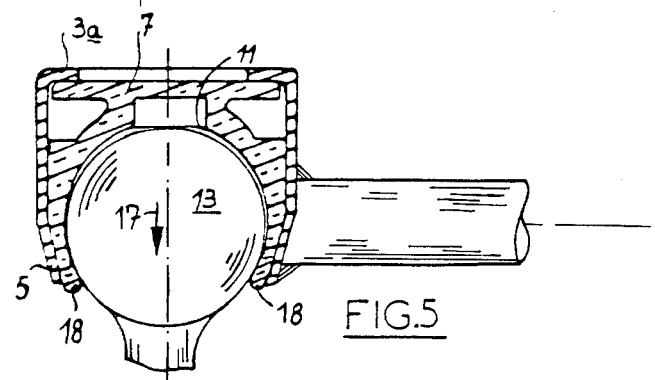
FIG. 5 is an axial cross-section similar to FIG. 4, but showing the position of the bearing during extraction of the ball.

The method of extraction of the ball 13 is shown in FIG. 5. When the ball is pulled outwardly in the direction of the arrow 17, it tends to leave the seating 11. The largest diameter of the ball engages against the front end of the bearing and compresses that front end between the ball and the truncated portion 5 of the housing. The front end of the ball cannot distend outwardly, as it is held by the rigid surfaces of the housing 2. However, the plastic material from which the bearing is made is susceptible of compression and, thus, as sufficient extraction force is applied to the ball, the front end of the bearing distends axially, and forms a thin flange 18, which projects slightly from the front end of the housing. The force required to extract the ball is thus appreciably greater than the force which is sufficient to insert the ball into the bearing.

An articulation joint, such as that described with reference to FIGS. 1–5, can be provided, for example, on the control lever or gear lever of a gearbox in an automobile. In such a construction, the force needed for the insertion of the ball into the socket ranges from approximately 8 to 15 daN, so that the assembly can be easily carried out. The articulation joint formed in this way is dismantleable, but the effort needed for the extraction of the ball is equal to or greater than 50 daN.

Tests have been carried out to show that the articulation joint can withstand, without detracting from its qualities, being dismantled with at least ten times this force, and this is more than adequate in the present instance.

Figure 7:
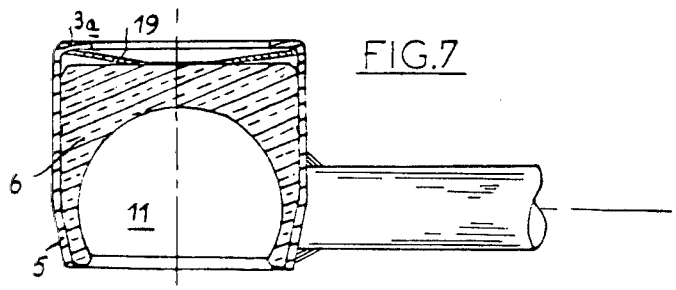
FIG. 7 is an axial section similar to FIG. 2, but showing a further alternative construction.

It will be understood that, without departing from the scope of the invention, it is possible to modify the springs effect at the base of the bearing. FIG. 7 illustrates a preferred method of construction, which utilizes a bearing without special shapings such as cavities, and wherein a spring disc 19 of the "Belleville" type is attached to the bearing. The disc 19 is positioned between the base of the bearing 6 and the inturned sides 3a of the housing 2. This disc, therefore, constitutes a flat spring, which provides for axial displacement of the base of the bearing in this construction. The bore of the bearing is not subject to an axial reduction in length, when a compressive force is applied to it on insertion of the ball.

It should, also, be noted that the Belleville disc 19 can be replaced by a corrugated disc, by a wing disc, by a rubber disc, or by a disc made from any other deformable and resilient material, made integral with or separately from the bearing 6. With any of these constructions, the bearing 6 is, then, capable of axial movement in the housing 2.

It should also be noted, that in an alternative construction, it is possible to combine, advantageously, the elasticity provided by a special shaping of the bearing, as illustrated in FIGS. 1–5, with the spring effect provided by a spring disc, in order to reduce to a minimum the force necessary for the insertion of the ball, without diminishing the force required for the extraction of the ball.

Among the principal advantages of the invention, the following will be mentioned:

the ease of assembly of the articulation joint, this assembly needing only a reduced force as compared with known constructions;

the good stability of the articulation joint in relation to the various forces to which it can be subjected, this stability being created, on the one hand, by the absence of auxiliary parts on the exterior of the housing, and, on the other hand, by the resistance of the ball to extraction from the bearing—the ball and socket joint nevertheless remaining dismantleable;

the cost of manufacture, which for a ball and socket joint of this quality, is appreciably lower than that of a similar known type of ball and socket joint. Indeed, the procedures needed for the manufacture of the housing 2, the positioning of the bearing 6, which can be molded in situ, and the production of the rear end support for the base of the bearing, are simple operations, and can be entirely automated; in addition, the effort required on the part of the fitter who assembles the ball into the socket, is minimal, leading to a reduction in fatigue.

Having, thus, described the invention what is claimed is:

1. A socket of a ball and socket joint comprising:
   (a) a rigid housing, comprising an open end and a closed end, a reduced diameter section at the open end in communication with an enlarged section inward from the closed end;
   (b) a bearing located in the housing, the bearing being formed from a resilient material complementary to the housing and having a part spherical integral seating surface and an opening at the open end to receive a ball, a peripheral opening formed in the bearing between the bearing and housing positioned inward from the open end past the spherical surface center;
   the bearing having an elasticity in the axial direction during the insertion of a ball such that the bearing is capable of movement in the axial direction relative to the rigid housing partially filling the peripheral opening; and
   said axial movement positioning the open end in the enlarged section allowing the opening to distend and enlarge to receive the ball.

2. A socket of a ball and socket joint as claimed in claim 1 wherein:
   the housing has a reduced diameter section and an enlarged cross-section in communication with the reduced diameter section, the portion of the bearing around the opening thereof being located in the reduced diameter section of the housing, the portion of the bearing around the opening entering the enlarged cross-section of the housing when displaced in the direction of insertion of a ball, and further wherein the portion of the bearing around the open end distends to enlarge the opening to receive the ball when in the displaced position.

3. A socket for a ball and socket joint as claimed in claim 1 or claim 2, wherein the bearing comprises: a main portion in which the seating surface is formed, and a base, at least one cavity being formed between the main portion and the base, and wherein the main portion is adapted for axial movement relative to the base when the bearing is placed in compression, the main portion, base and cavity cooperating to define the elasticity of the bearing.

4. A socket for a ball and socket joint as claimed in claim 3, which further comprises: an internal shoulder formed in the housing, the base of the bearing resting on the internal shoulder of the housing and the open end of the bearing being arranged in an open end of the housing.

5. A socket for a ball and socket joint as claimed in claim 1 or claim 2, which further comprises: a spring component disposed between the closed end of the bearing and an internal shoulder of the housing, the spring component defining the axial elasticity of the bearing.

6. A socket for a ball and socket joint as claimed in claim 1 wherein the seating surface in the bearing extends over more than half a sphere so that the opening has a diameter less than that of the spherical seating surface.

7. A socket for a ball and socket joint as claimed in claim 2 wherein: the housing is cylindrical and the reduced cross-section part of the housing is formed by a truncated cone, the part of the bearing around the opening having a complimentary truncated conical shape.

8. A socket for a ball and socket joint as claimed in claim 2 wherein: the housing is cylindrical, and the reduced cross-section part is defined by an inturned flange at one end of the housing.

9. A ball and socket joint having a socket as claimed in claim 2, which further comprises: a ball, the ball being received in the bearing, the ball having a diameter greater than the diameter of the opening in the bearing, but less than the smallest diametral dimension of the reduced cross-section part of the housing.

10. A method of assembling a ball and socket joint comprising the steps of:
(a) providing an open ended rigid cylindrical housing having a reduced diameter at an open end in communication with an enlarged section;
(b) providing a single piece bearing molded from a resilient material, the bearing having an open front and rear end, the bearing having a base at its rear end, a part spherical internal bearing surface, the open front end being of smaller diameter than the part spherical bearing surface;
(c) inserting the bearing through the open rear end of the housing and engaging the front end of the bearing with the reduced diameter portion of the housing;
(d) bending over the rear end of the housing to provide an inwardly directed support shoulder for engagement by the base of the bearing providing a opening between the bearing and housing; and
(e) inserting a ball through the open front end of the bearing, the engagement of the ball with the front end of the bearing causing the bearing to be displaced axially towards the rear, filling the peripherial opening so that the ball can enter the bearing.

11. A method of assembling a ball and socket joint as claimed in claim 10, in which the axial force applied through the ball during its insertion is transmitted to the bearing, the front portion of which retracts into the housing to disengage itself from the reduced diameter portion of the housing, so that a mechanical play is created between the front portion of the bearing and the housing, which permits the front portion of the bearing to distend outwardly to allow the ball to enter through the open front end and to seat in the part spherical seating, the front end of the bearing then contracting over the front of the ball to retain the latter in the bearing.

12. A method of extracting the ball from a ball and socket joint as claimed in claims 10 or 11, in which the force of extraction of the ball is required to compress the front part of the bearing between the ball and the reduced cross-section portion of the housing until the ball can pass through the open end of the bearing, such that the force required for extracting the ball is considerably greater than that required for its insertion.

* * * * *